United States Patent [19]

Larson

[11] E Re. 31,332

[45] Reissued Aug. 2, 1983

[54] MEMBRANE SWITCH WITH MEANS FOR PREVENTING CONTAMINATION OF THE INTERIOR THEREOF

[75] Inventor: Willis A. Larson, Crystal Lake, Ill.

[73] Assignee: Oak Industries Inc., Rancho Bernardo, Calif.

[21] Appl. No.: 271,771

[22] Filed: Jun. 8, 1981

Related U.S. Patent Documents

Reissue of:

[64] Patent No.: 4,249,044
Issued: Feb. 3, 1981
Appl. No.: 32,113
Filed: Apr. 23, 1979

[51] Int. Cl.[3] ..... H01H 13/70

[52] U.S. Cl. ..... 200/5 A; 200/159 B; 200/306

[58] Field of Search ..... 200/1 R, 5 R, 5 A, 159 B, 200/306

[56] References Cited

U.S. PATENT DOCUMENTS

| | | | |
|---|---|---|---|
| 3,995,128 | 11/1976 | Hawkins | 200/5 A |
| 4,018,999 | 4/1977 | Robinson et al. | 200/5 A |
| 4,046,975 | 9/1977 | Seeger, Jr. | 200/5 A |
| 4,046,981 | 9/1977 | Johnson et al. | 200/5 A X |
| 4,065,649 | 12/1977 | Carter et al. | 200/5 A |
| 4,066,451 | 1/1978 | White et al. | 200/5 A |

FOREIGN PATENT DOCUMENTS

| | | | |
|---|---|---|---|
| 2256992 | 6/1973 | Fed. Rep. of Germany | 200/5 A |

*Primary Examiner*—J. R. Scott
*Attorney, Agent, or Firm*—Kinzer, Plyer, Dorn and McEachran

[57] ABSTRACT

A membrane switch has a substrate and a plurality of first conductors formed on the substrate. A flexible membrane having a plurality of second conductors formed thereon is positioned relative to the substrate by a spacer which may be adhesively secured to both membrane and substrate. There are openings in the spacer in register with aligned first and second conductors. The membrane is caused to move toward the substrate through an opening to cause contact between the aligned first and second conductors in response to pressure upon the exterior of the membrane. There are vent passage means interconnecting the spacer openings, which vent passage means may be open to the atmosphere.

17 Claims, 4 Drawing Figures

MEMBRANE SWITCH WITH MEANS FOR PREVENTING CONTAMINATION OF THE INTERIOR THEREOF

Matter enclosed in heavy brackets [ ] appears in the original patent but forms no part of this reissue specification; matter printed in italics indicates the additions made by reissue.

SUMMARY OF THE INVENTION

The present invention relates to membrane switches using silver conductors and in particular to a means for impeding migration of the silver between conductors.

One purpose is a membrane switch in which silver may be silk screened, printed or painted, in conductive paths, on spaced surfaces of the switch, and wherein the switch is essentially sealed from outside contamination except for a vent passage of substantial length, suitable for equalizing internal and external pressures, which vent passage also interconnects the chambers within the switch where the switching action takes place.

Another purpose is a switch of the type described in which migration of silver between conductors is substantially impeded by retarding moisture film formation upon the surface of the switch assembly.

Another purpose is a switch of the type described in which pressure equalization between interior and exterior portions of the switch is provided with a minimum of air exchange, thereby retarding the admission of contamination into the interior of the switch.

Another purpose is a membrane switch in which the silver conductors are substantially buried in a resin, used for adhesive purposes, to impede silver migration.

Another purpose is a membrane switch in which the switch is substantially or totally sealed, thereby preventing contamination moisture from reaching the interior of the switch, but at the same time providing means for internal and external pressure equalization.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
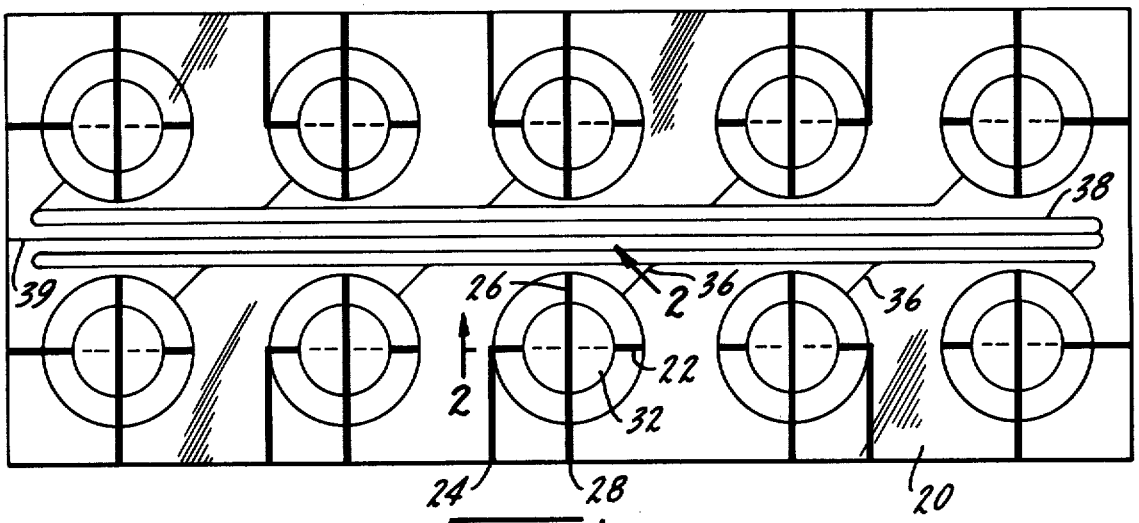
FIG. 1 is a diagrammatic top view of a switch of the type described.

The present invention concerns membrane switches of the type generally shown in my prior U.S. Pat. Nos. 3,988,551 and 4,017,697, as well as several similar patents relating to the same subject matter. With the introduction of microprocessors and other sophisticated relatively inexpensive electronics, switching functions can now be reduced to the opening and closing of contacts, permitting a simplified and more reliable switch construction. The membrane switch disclosed herein is specifically directed to this concept wherein there is only an opening and closure of a switch contact with more sophisticated switching functions being carried on by the auxiliary electronics.

One method of making an economical membrane switch uses conductors which are painted, printed or silk screened onto one or more adjacent surfaces, customarily the supporting substrate and the movable membrane. In this connection, although the present application will disclose a membrane switch in which the supporting substrate is also a flexible membrane, it should be understood that the principles disclosed herein are equally applicable to a membrane switch in which the substrate is rigid. Because of its high electrical conductivity, silver is a very desirable conductive metal which may be painted, printed or silk screened onto a surface. Other metals of the non-noble type either do not normally remain conductive after they have been painted on a supporting surface, or are poor conductors. Silver, on the other hand, remains conductive but has the serious drawback that the silver particles tend to migrate from the anode to the cathode and ultimately a high impedance short may be formed between normally separate conductors or elements. The present invention is particularly directed to means for impeding the formation of such a high impedance short to the point where whatever silver migration does take place does not affect the useful life of the switch.

The phenomenon of silver migration has long been known and has been extensively documented in numerous publications over the last 30 years. Essentially, migration takes place where there is a potential difference between spaced silver conductors and there is sufficient humidity, normally a continuous moisture film, to permit the metal silver to be ionized to positive silver ions. Normally, the following chemical reaction takes place:

$$2AG^{+}+20H^{-}\rightarrow 2AG(OH)\rightarrow AG_2O+H_2O$$

In essence, the metallic silver is changed to a silver hydroxide which is soluble in water. Silver then deposits in the vicinity of the cathode due to the voltage potential. The migration is from the anode to the cathode, but the dendrites that are formed grow from the cathode toward the anode. In the case of an alternating potential, the dendrites will be formed from both conductors toward each other.

The growth of the dendrite in silver migration can be extremely rapid under conditions of sufficiently high applied voltage and substantial humidity. At times only a few minutes or even seconds are necessary to complete a short between two spaced conductors when the spacing is small.

Although silver has been in substantial use in electronics for a long period of time, the problem of silver migration has not been of a nature as to eliminate silver as a conductor. In television normally the heat of the various components eliminates any moisture. In other areas the component may normally have a short useful life and is designed to be replaced after a period of time. However, in membrane switches of the type which must have a life permitting several million operating cycles and which will be in use for several years, silver migration can be a problem. The present invention recognizes the fact of silver migration, but provides means for impeding such migration to the point where it will not affect the useful life of the switch. Thus, although there may be migration, it will take such a sufficient period of time that it will not materially affect the life of the switch in its particular application.

Various solutions have been presented to prevent silver migration. There have been previous attempts to seal the entire switch construction so as to prevent moisture from forming inside the switch in the area of the silver conductors. However, such prior sealing attempts were not always practical as the plastic films used in the switch construction will, over a period of time, transfer the exterior humidity to the interior due to their permeability. For example, 0.005-inch thick Mylar at 38° C. will transmit water vapor at the rate of 0.3 grams per 100 square inches of surface area exposed per 24 hours, and hydrogen sulfide at the rate of 4 cubic centimeters per 100 square inches of surface area exposed per 24 hours per atmosphere of pressure. In addition, such a seal created other problems, specifically changes in atmospheric pressure which caused the force required to actuate the switch to vary substantially from the time of manufacture and during application, depending upon barometric pressure and local atmospheric conditions.

The present invention overcomes both of the above drawbacks in a switch which may be substantially or completely sealed. The moisture problem is overcome by initially ensuring that the substrate and membrane material are so selected, handled and treated as to prevent a moisture film forming thereon. In addition, the size, shape and arrangement of the interior spaces of the switch are so formed as to prevent the accumulation of droplets of moisture or moisture paths of a sufficient size to create the continuous moisture film between silver conductors which is necessary for the rapid progression of silver migration. Pressure equalization is provided through the use of a tortuous labyrinthine passage connecting all of the chambers or spaced within the switch to the atmosphere with the result that at no time during operation of the switch is the volume of air moved sufficient to provide an interchange between exterior and interior air in the areas of the silver conductors. In the alternative, there may be a completely sealed construction in which the interior spaces are connected by a long, tortuous path of substantial length, which path may be connected to a chamber, separate and apart from the switch, which can accommodate changes in interior pressure brought about by switch operation.

Figure 2:
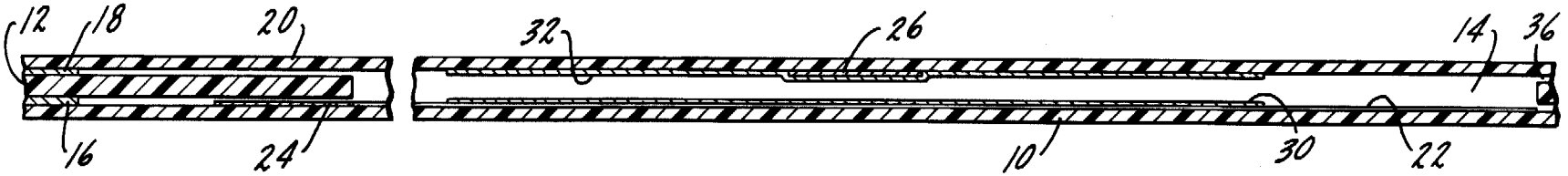
FIG. 2 is an enlarged section along plane 2—2 of FIG. 1.

In FIGS. 1 and 2 the diagrammatic illustration of a membrane switch includes a substrate 10 which may be flexible. A spacer 12, having a series of spaced openings 14, is secured by an adhesive layer 16 to the substrate 10 and is secured by a second adhesive layer 18 to a flexible transparent membrane 20. The adhesive and membranes may be formed of conventional materials.

Looking specifically at FIG. 1, a series of first conductors 22 may be painted or otherwise applied to the substrate 10 and may be formed of silver. Each of these conductors may have individual conductive leads, similarly formed of silver, indicated at 24, which may terminate at a common point adjacent to one area of the substrate 10, although such arrangement is not shown herein. Normally, the conductive leads will terminate or end in a tail which extends outwardly from the substrate and is used to connect the switch to the auxiliary electronics.

In like manner, silver conductors 26 are formed on the underside of membrane 20 and each of the conductors 26 may have conductive leads 28, formed of silver, which again may terminate at a common point on the membrane 20. Such conductive leads may terminate in a conventional tail.

Because the silver conductors 22 and 26 will be quite thin, for example between 0.025 and 0.050 inch in width, it is desirable to have a greater area for contact to ensure a good electrical connection. Thus, each of the conductors 22 may have a spot 30 formed thereon. The spots 30 may be formed of carbon or a similar non-migrating material which has an electrical conductivity lower than silver. The spots are in register or alignment with similar conductive spots 32 formed upon conductors 26. The conductive spots 30 and 32 may, for example, have a diameter of 0.3 to 0.4 inch, assuming that openings 14 each have a diameter of approximately 0.5 inch. The spots or conductive areas may be painted upon the silver conductors after the conductors have first been applied to the substrate and membrane. In addition, the spot material, since it covers the silver, may retard the migration of the silver in the covered areas. The same is true for those areas of silver covered by adhesive. The resinous adhesive material provides a substantial impediment to migration.

The switch construction of FIGS. 1 and 2 will be sealed, except for an atmospheric vent passages described herein. The seal will be essentially created during the process of lamination in the formation of the switch itself. The membrane and substrate are adhesively secured to the spacer by means of the described adhesive, which will effectively seal the interior spaces 14 from the atmosphere. As indicated above, in prior switch constructions such a seal created difficulties in that exterior moisture can be transferred to the switch interior and the interior of the switch, particularly in the spaces 14, underwent certain changes in atmospheric pressure which affected the operating capabilities of the switch. As to the moisture problem, the interior of both the substrate and membrane will be appropriately treated, handled and selected, such that the surface is substantially impervious to the formation of a moisture film thereupon. Although moisture may reach the interior due to the permeability of the substrate and membrane, proper care of the interior surfaces will prevent the moisture from spreading from droplets to a continuous film.

As to changes in atmospheric pressure, each of spaces 14 is connected by a small vent passage formed in the adhesive layer 18 to a common tortuous vent passage of substantial length and having a generally labyrinthine configuration. Note particularly FIG. 1. The individual lead-in passages for each space 14 are indicated at 36 and such passages are each connected to the main vent passage 38 which, as illustrated, has a substantial length, materially greater than that of the length of the switch.

Passage 38 terminates, as at 39, at the edge of membrane 20 so that it, in effect, is vented to atmosphere. Passages 36 and 38 are formed in the adhesive by careful application of the adhesive during the switch manufacturing process, for example by painting of silk screening. There may be a similar and identical or perhaps different combination of passages in the adhesive layer 16 connecting the spacer 12 to substrate 10. In some applications there may be only vent passages in one adhesive layer, whereas in other switch applications it may be desirable to have vent passages in both adhesive layers. In addition, the passages in the membrane and substrate may be interconnected by space 14.

The vent passage provides pressure equalization between the interior and exterior of the switch. However, in operation of the switch, when the membrane is moved toward the substrate to close the contacts, the volume of air which actually is moved within the combined space of all of the areas 14 and passages 36 and 38, does not permit the entrance of outside contaminant-laden air into spaces 14. For example, assuming vent passage 38 has a width of 0.100 inch and a height of 0.001 inch, the operation of a switch through a spacer opening of 0.5 inch will only move a seven-inch air column. There is no pumping action in that no air is pumped into the interior space 14. The vent passage does, however, provide for pressure equalization and hence, the pressure inside of the switch will always be the same as that of the surrounding atmosphere to permit the switch to be operated in its normal manner. The passages 36 and 38 may be of very small size, as what is important is to provide pressure equalization and to effectively restrict or prevent the introduction of exterior dust, dirt and contaminants into the interior. Such foreign material, if it reaches the switch interior, will reduce or eliminate the ability of the interior surfaces to prevent the formation of a moisture film.

In addition to the described pressure equalization, passages 36 and 38 being of extremely small size, and in like manner the spaces or chambers or areas 14 being similarly of small size, such size and shape of the described areas will inhibit the formation of droplets of sufficient size to provide a moisture film upon the silver conductors. Without a moisture film, there will be no silver migration. The moisture film is necessary for silver migration, and the size and shape of the described areas prevents the formation of droplets which in turn would create the moisture film necessary for migration.

Figure 3:
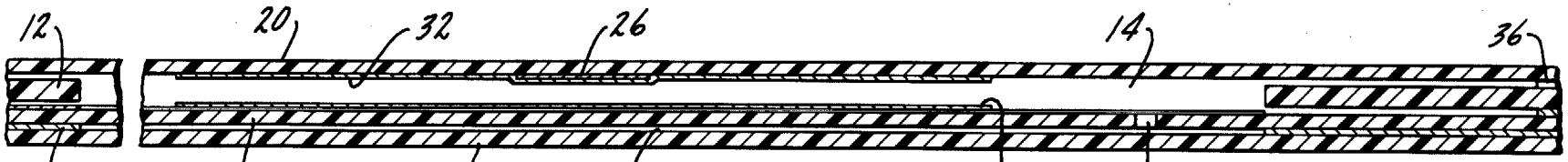
FIG. 3 is a section, similar to FIG. 2, but showing a modified form of switch.

In the construction of FIG. 3, a second substrate 40 has been added in juxtaposed relation with substrate 10. substrate 40 could be placed against the membrane, as both the membrane and substrate are flexible, but as shown herein, substrate 40 is positioned against substrate 10. An adhesive layer 42 is used to attach substrate 10 to substrate 40, and a chamber 44 is formed in a space in which no adhesive is present. Chamber 44 in turn is connected by a passage 46 to one of the spaces 14 and, as described in connection with FIGS. 1 and 2, all of the spaces 14 are interconnected by the described tortuous or labyrinthine passage. The switch construction of FIG. 3 will be totally sealed and there will be no vent passage such as indicated at 39. Space of chamber 44, which as shown in cross section has an approximate size the same as space 14, will in actuality be substantially larger, as it will extend beyond the boundaries of the round space 14 in the plane perpendicular to the paper of the drawing. Chamber 44 will function as an accumulator, as it can accomodate changes in pressure caused by operation of the switch. During switch operation, the size of chamber 44 permits movement of small amounts of air within the overall connecting passage configuration to the point where movement of the membrane is not inhibited during switch operation. The switch of FIG. 3 is completely sealed. Moisture accumulation will be inhibited by treatment of the interior surfaces of the switch, as in the construction of FIGS. 1 and 2. Changes in atmospheric pressure are accomodated by means of the chamber 44 formed between the first and second substrates.

Figure 4:
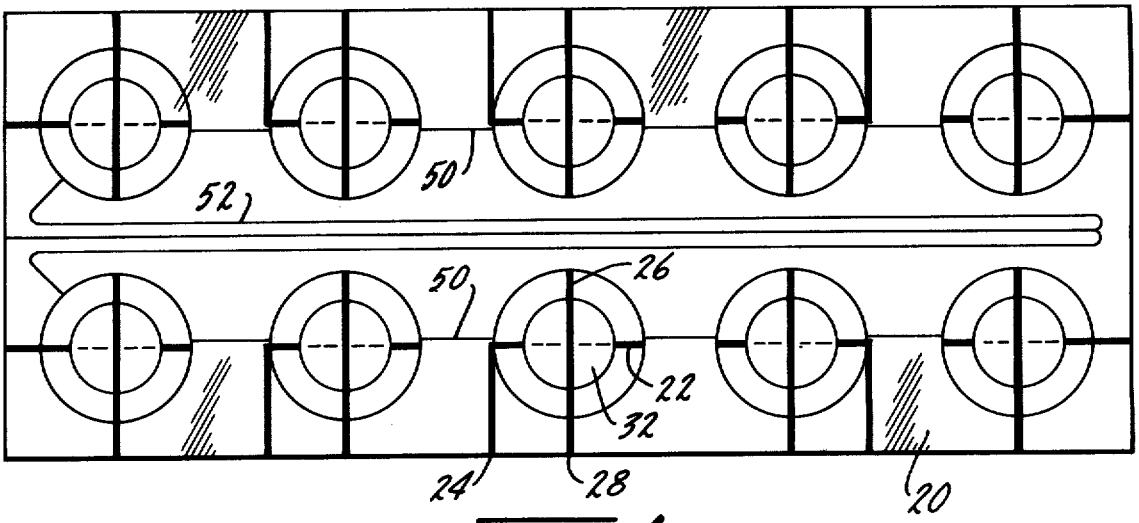
FIG. 4 is a diagrammatic top view showing a further form of switch.

The construction of FIG. 4 is identical with that of FIGS. 1 and 2 except that each of the spaces 14 are interconnected together by passages 50. The end space of each row of spaces 14 is connected to a main vent passage 52 which is similar to passage 38 in the FIGS. 1 and 2 construction. In all other respects the constructions are the same. There are variations of this arrangement in that smaller groups of spaces 14 may be interconnected with one of each such group connected to the main vent passage. Also, it is within the scope of the invention to both interconnect the spaces 14, as shown in FIG. 4, in addition to connecting each space 14 with the main vent passage, as in FIG. 1.

Whereas the preferred form of the invention has been shown and described herein, it should be realized that there may be many modifications, substitutions and alterations thereto.

The embodiments of the invention in which an exclusive property or privilege is claimed are defined as follows:

1. In a membrane switch, a substrate, a plurality of first conductors formed on said substrate, a flexible membrane, a plurality of second conductors formed on said membrane, a spacer positioned between said substrate and membrane, openings in said spacer in register with aligned first and second conductors, said membrane moving toward said substrate through an opening to cause contact between aligned first and second conductors in response to pressure upon the exterior of said membrane, and vent passage means interconnecting said spacer openings, said vent passage means including a main labyrinth passage and secondary passages connecting each spacer opening with said main passage.

2. The switch of claim 1 further characterized in that said vent passage means is positioned between said spacer and said substrate.

3. The switch of claim 1 further characterized in that said vent passage means is positioned between said spacer and said membrane.

4. The switch of claim 1 further characterized in that said spacer is adhesively secured to said substrate and membrane, said vent passage means being formed in the adhesive securing said spacer to said substrate.

5. The switch of claim 1 further characterized in that said spacer is adhesively secured to said substrate and membrane, said vent passage means being formed in the adhesive securing said spacer to said membrane.

6. The switch of claim 1 further characterized in that said vent passage means is open to atmosphere.

7. The switch of claim 6 further characterized in that said vent passage means extends a substantial distance, materially greater than the distance needed to only interconnect said spacer openings.

8. The switch of claim 1 further characterized in that at least one of said first and second conductor areas is formed of silver.

9. The switch of claim 1 further characterized in that both said first and second conductors are formed of silver.

10. The switch of claim 1 further characterized by and including a second substrate positioned adjacent either said substrate or said membrane, a chamber formed by said second substrate and passage means formed in either the substrate or the membrane to which the second substrate is attached, said passage means connecting said chamber and said vent passage means.

11. The switch of claim 10 further characterized in that said second substrate is adhesively attached to either said substrate or said membrane, said chamber being formed by the adhesive, said second substrate and either the substrate or the membrane to which it is attached.

12. The switch of claim 1 further characterized in that said vent passage means connects each opening with an adjacent opening.

*13. In a membrane switch, a substrate, first conductor means formed on said substrate, a flexible membrane, second conductor means formed on said membrane, a spacer positioned between said substrate and membrane, openings in said spacer in register with aligned portions of said first and second conductor means, said membrane moving toward said substrate through an opening to cause contact between aligned first and second conductor means in response to pressure upon the exterior of said membrane, a second substrate positioned adjacent either said substrate or said membrane, sealed from atmosphere chamber means formed between and bounded by said second substrate and the adjacent membrane or substrate, and vent passage means connecting said spacer openings with said chamber means.*

*14. The switch of claim 13 further characterized in that said vent passage means interconnects said spacer openings.*

*15. The switch of claim 13 further characterized in that said vent passage means includes a passage between an opening and said chamber means.*

*16. The switch of claim 13 further characterized in that said spacer is adhesively secured to said membrane and substrate, said vent passage means being formed in the adhesive securing said spacer.*

*17. The switch of claim 13 further characterized in that said sealed from atmosphere chamber means includes a chamber, said vent passage means for connecting said spacer openings with said chamber include an opening in either the adjacent membrane or substrate.*

* * * * *